United States Patent
Lim et al.

(10) Patent No.: US 8,843,555 B2
(45) Date of Patent: Sep. 23, 2014

(54) SYSTEM AND METHOD FOR PROVIDING NEIGHBOR CONNECT SERVICE

(75) Inventors: Sam Yeol Lim, Yongin-si (KR); Young Suk Kwon, Seoul (KR); Myong Jin Chong, Siheung-si (KR); Hui Joung Hwang, Seoul (KR); David Lee, Seoul (KR); Myung Hun Kang, Seoul (KR); Min Jung Kim, Seongnam-si (KR); Chan Hyun Roh, Seongnam-si (KR); Sun Woo Jeong, Seoul (KR)

(73) Assignee: NHN Corporation, Seongnam-si (KR)

( * ) Notice: Subject to any disclaimer, the term of this patent is extended or adjusted under 35 U.S.C. 154(b) by 285 days.

(21) Appl. No.: 13/179,127

(22) Filed: Jul. 8, 2011

(65) Prior Publication Data
US 2012/0030284 A1 Feb. 2, 2012

(30) Foreign Application Priority Data
Jul. 9, 2010 (KR) .................. 10-2010-0066471

(51) Int. Cl.
*G06Q 10/10* (2012.01)
*G06Q 50/00* (2012.01)
*G06F 17/30* (2006.01)
*H04L 12/58* (2006.01)

(52) U.S. Cl.
CPC ................ *G06Q 10/10* (2013.01); *G06Q 50/01* (2013.01); *G06F 17/3089* (2013.01); *H04L 12/588* (2013.01); *G06F 2213/0038* (2013.01)
USPC .......................................................... 709/204

(58) Field of Classification Search
CPC .. G06F 17/3089; G06Q 10/101; G06Q 50/01; H04L 12/588; H04L 51/36
USPC .......................................................... 709/204
See application file for complete search history.

(56) References Cited

U.S. PATENT DOCUMENTS

| | | | | |
|---|---|---|---|---|
| 7,590,612 | B2 * | 9/2009 | Forrest et al. | 706/55 |
| 2006/0284744 | A1 * | 12/2006 | Shotland | 341/50 |
| 2007/0168340 | A1 * | 7/2007 | Mahoney et al. | 707/4 |
| 2007/0255674 | A1 * | 11/2007 | Mahoney | 707/1 |
| 2007/0255712 | A1 * | 11/2007 | Mahoney et al. | 707/9 |
| 2009/0006341 | A1 * | 1/2009 | Chapman | 707/3 |

FOREIGN PATENT DOCUMENTS

| | | |
|---|---|---|
| KR | 10-2009-0030690 | 3/2009 |
| KR | 10-2010-0035684 | 4/2010 |

\* cited by examiner

*Primary Examiner* — Kristie Shingles
(74) *Attorney, Agent, or Firm* — Greer Burns & Crain Ltd.

(57) ABSTRACT

Provided are a system and a method for providing a neighbor connect service. The neighbor connect service method sets up a neighbor relationship between internal blogs and external blogs and provides information about a blog set up as the neighbor relationship based on the neighbor connect service.

18 Claims, 15 Drawing Sheets

SYSTEM AND METHOD FOR PROVIDING NEIGHBOR CONNECT SERVICE

CROSS-REFERENCE TO RELATED APPLICATION

This application claims priority from and the benefit of Korean Patent Application No. 10-2010-0066471, filed on Jul. 9, 2010, which is hereby incorporated by reference for all purposes as if fully set forth herein.

BACKGROUND OF THE INVENTION

1. Field of the Invention

Exemplary embodiments of the present invention relate to a system and method for providing a neighbor connect service, and more particularly, to a system and method for providing a neighbor connect service which provides a neighbor connect service between an internal blog and an external blog.

2. Discussion of the Background

A blog, which is a combination of the terms "web" and "log," is a website on which a user places postings on any subjects that the user is interested in. In addition, while blogs are personal websites, they provide services enabling users having similar interests to visit the blogs written by others and to easily recognize a blog update status through application of a neighbor connection function for active interactions among the users.

However, since conventional blogs provide a neighbor connection function only among subscribers who subscribe to a site providing the same blog service, there are limitations in that a user cannot subscribe to blogs provided by different sites in addition to a blog provided by one site and in that the information about blogs served by other sites is not provided.

Thus, there is a demand for a blog service extended to provide information about not only blogs served by a site of one company but also blogs served by sites of other companies.

SUMMARY OF THE INVENTION

Exemplary embodiments of the present invention provide a system and a method for providing a neighbor connect service which provides a neighbor connect service between internal blogs and external blogs.

Exemplary embodiments of the present invention also provide a system and a method for providing a neighbor connect service which displays a neighbor added by a user of a blog, a neighbor adding the user, and a visiting blogger.

Exemplary embodiments of the present invention also provide a system and a method for providing a neighbor connect service which enables independent use of a neighbor connect service program in an external blog.

Exemplary embodiments of the present invention also provide a system and a method for providing a neighbor connect service which enables an external blogger to use a neighbor connect service for connecting with another external blog.

Exemplary embodiments of the present invention also provide a system and a method for providing a neighbor connect service in various formats, proper for needs of external bloggers, and tools of external blogs.

Exemplary embodiments of the present invention also provide a system and a method for providing a neighbor connect service which continually displays a neighbor connect service in order to increase a number of new creations.

Exemplary embodiments of the present invention also provide a system and a method for providing a neighbor connect service which simplifies a neighbor addition function for adding a greater number of neighbors.

Exemplary embodiments of the present invention also provide a system and a method for providing a neighbor connect service which enables use of a plurality of neighbor connect service programs with a single identity (ID).

Exemplary embodiments of the present invention also provide a system and a method for providing a neighbor connect service which strengthens security, authorization, and access since a neighbor connect service is readily spread but is associated with personal neighbor information.

Exemplary embodiments of the present invention also provide a system and a method for providing a neighbor connect service which enables easy identification of new postings of neighbors registered by a user and new postings of neighbors registered by other users through a new posting notification function.

Exemplary embodiments of the present invention also provide a system and a method for providing a neighbor connect service which provides a neighbor connect service program through open neighbor management, thereby enabling easy management of neighbors and new postings.

Exemplary embodiments of the present invention also provide a system and a method for providing a neighbor connect service which provides a neighbor statistical function and provides a new value-added service using the neighbor statistical function.

Additional features of the invention will be set forth in the description which follows, and in part will be apparent from the description, or may be learned by practice of the invention.

An exemplary embodiment of the present invention discloses a system for providing a neighbor connect service, the system including a setup unit for setting up a neighbor relationship between internal blogs and external blogs and a provision unit providing information about a blog set up as the set up neighbor relationship based on the neighbor connect service, wherein the internal blogs are blogs of users subscribing to services of a company operating the neighbor connect service system, and the external blogs are blogs of users subscribing to services of other companies not operating the neighbor connect service system.

The system may further include a reception unit receiving a neighbor add request with respect to an external blog currently connected from a terminal of a user which operates the internal blog and is using the neighbor connect service, wherein the setup unit sets up the currently connected external blog as a neighbor group with respect to the user based on the received neighbor add request.

The system may further include a reception unit for receiving a neighbor add request from a terminal of a user connected to a blog providing the neighbor connect service but not using the neighbor connect service, a guide unit for guiding the neighbor connect service to the terminal of the user based on the neighbor add request, and an installation unit for installing a neighbor connect program for providing the neighbor connect service in the terminal of the user when the neighbor connect service is requested from the user, wherein the setup unit sets up a neighbor relationship with the external blog based on the installed neighbor connect program.

The system may further include a reception unit for receiving a neighbor add request with respect to an internal blog providing the neighbor connect service from a terminal of a user using an external blog providing the neighbor connect service, wherein the setup unit sets up the external blog to have a neighbor relationship as a neighbor group of the internal blog.

The system may further include a reception unit for receiving a neighbor add request with respect to an internal blog not using the neighbor connect service from a terminal of a user using an external blog providing the neighbor connect service, a guide unit for guiding the neighbor connect service with respect to the internal blog, and an installation unit for installing a neighbor connect service program on the internal blog when installation of the neighbor connect service program is requested from the terminal of the user using the internal blog, wherein the setup unit sets up a neighbor relationship between the external blog and the internal blog in the installed neighbor connect service program.

The provision unit may display a neighbor added by the user of the blog, a neighbor adding the user as a neighbor, and a user visiting the blog, may be used independently in the external blog by a neighbor connect service program, and may provide a service for the user of the external blog to connect with another external blog.

The provision unit may continually display the neighbor connect service to increase a number of new users, may provide a neighbor add function more simplified than an existing service in order to add a greater number of neighbors than a predetermined level, and may provide the neighbor connect service to enable use of a plurality of neighbor connect service programs using a single user ID.

The provision unit may provide security, authorization, or access functions with respect to personal information about a user set up as a neighbor relationship based on the neighbor connect service.

The provision unit may identify new postings of neighbors registered by the user and new postings of neighbors registered by other people through a new posting notification function, may manage neighbors or new postings through a neighbor connect service program, and may provide a neighbor statistical function.

The system may further include a transfer unit making a transfer to a site to install a neighbor connect service program when copying of the neighbor connect service program is selected from a terminal of a user, and transferring the site for installation of the neighbor connect service program to an installation page of the neighbor connect service program selected by the user, when a program of the user installing the program is selected on the site for the installation of the neighbor connect service program, and an installation unit for installing the neighbor connect service program in the terminal of the user.

An exemplary embodiment of the present invention discloses a method for providing a neighbor connect service, the method including setting up a neighbor relationship between internal blogs and external blogs, and providing information about a blog set up as the set up neighbor relationship based on the neighbor connect service, wherein the internal blogs are blogs of users subscribing to services of a company operating the neighbor connect service system, and the external blogs are blogs of users subscribing to services of other companies not operating the neighbor connect service system.

The setting up the neighbor relationship may include receiving a neighbor add request with respect to a currently online external blog from a terminal of a user which operates the internal blog and is using the neighbor connect service, and setting up of the currently online external blog as a neighbor group with respect to the user based on the received neighbor add request.

The setting up of the neighbor relationship may include receiving a neighbor add request from a terminal of a user connected to a blog providing the neighbor connect service but not using the neighbor connect service, guiding the neighbor connect service to the terminal of the user based on the neighbor add request, installing a neighbor connect program providing the neighbor connect service in the terminal of the user when the neighbor connect service is requested from the user, and setting up a neighbor relationship with the external blog based on the installed neighbor connect program.

The setting up of the neighbor relationship may include receiving a neighbor add request, with respect to an internal blog providing the neighbor connect service, from a terminal of a user using an external blog providing the neighbor connect service, and setting up the external blog to have a neighbor relationship as a neighbor group of the internal blog.

The setting up of the neighbor relationship may include receiving a neighbor add request with respect to an internal blog not using the neighbor connect service from a terminal of a user using an external blog providing the neighbor connect service, guiding the neighbor connect service with respect to the internal blog, installing a neighbor connect service program on the internal blog when installation of the neighbor connect service program is requested from the terminal of the user using the internal blog, and setting up a neighbor relationship between the external blog and the internal blog in the installed neighbor connect service program.

The neighbor connect service may display a neighbor added by the user of the blog, a neighbor adding the user as a neighbor, and a user visiting the blog, is independently used in the external blog by a neighbor connect service program, and provides a service for the user of the external blog to connect with another external blog.

The neighbor connect service may continually display the neighbor connect service to increase a number of new users, may provide a neighbor add function that is more simplified than an existing service in order to add a greater number of neighbors than a predetermined level, and may enable use of a plurality of neighbor connect service programs using a single user ID.

The neighbor connect service may provide security, authorization, or access functions with respect to personal information about a user set up as a neighbor relationship based on the neighbor connect service.

The neighbor connect service may identify new postings of neighbors registered by the user and new postings of neighbors registered by other people through a new posting notification function, may manage neighbors or new postings through a neighbor connect service program, and may provide a neighbor statistical function.

The method may further include making a transfer to a site to install a neighbor connect service program on, when copying of the neighbor connect service program is selected from a terminal of a user, transferring the site for installation of the neighbor connect service program to an installation page of the neighbor connect service program selected by the user when a program of the user installing the program is selected on the site for the installation of the neighbor connect service program, and installing the neighbor connect service program in the terminal of the user.

It is to be understood that both the foregoing general description and the following detailed description are exemplary and explanatory and are intended to provide further explanation of the invention as claimed.

EFFECT OF THE INVENTION

According to exemplary embodiments of the present invention, there is provided a system and a method for providing a neighbor connect service which provides a neighbor connect service between internal blogs and external blogs.

According to exemplary embodiments of the present invention, there is provided a system and a method for providing a neighbor connect service which displays a neighbor added by a user of a blog, a neighbor adding the user, and a visiting blogger.

According to exemplary embodiments of the present invention, there is provided a system and a method for providing a neighbor connect service which enables independent use of a neighbor connect service program in an external blog.

According to exemplary embodiments of the present invention, there is provided a system and a method for providing a neighbor connect service which enables an external blogger to use a neighbor connect service for connection with another external blog.

According to exemplary embodiments of the present invention, there is provided a system and a method for providing a neighbor connect service in various formats that is proper for needs of external bloggers, and tools of external blogs.

According to exemplary embodiments of the present invention, there is provided a system and a method for providing a neighbor connect service which continually displays a neighbor connect service in order to increase a number of new creations.

According to exemplary embodiments of the present invention, there is provided a system and a method for providing a neighbor connect service which simplifies a neighbor addition functionality to add a greater number of neighbors.

According to exemplary embodiments of the present invention, there is provided a system and a method for providing a neighbor connect service which enables use of a plurality of neighbor connect service programs with a single identity (ID).

According to exemplary embodiments of the present invention, there is provided a system and a method for providing a neighbor connect service which strengthens security, authorization, and access since a neighbor connect service is readily spread but is associated with personal neighbor information.

According to exemplary embodiments of the present invention, there is provided a system and a method for providing a neighbor connect service which enables easy identification of new postings of neighbors registered by a user and new postings of neighbors registered by other people through a new posting notification function.

According to exemplary embodiments of the present invention, there is provided a system and a method for providing a neighbor connect service which provides a neighbor connect service program through open neighbor management, thereby enabling easy management of neighbors and new postings.

According to exemplary embodiments of the present invention, there is provided a system and a method for providing a neighbor connect service which provides a neighbor statistical function and provides a new value-added service using the neighbor statistical function.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
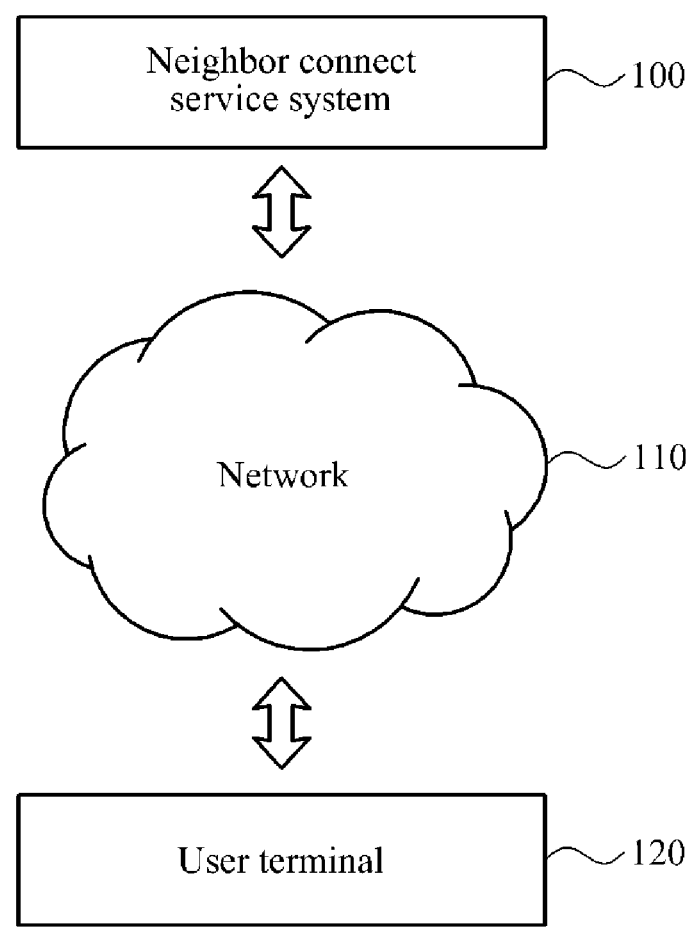
FIG. 1 illustrates a connection between a neighbor connect service system and a user terminal according to an exemplary embodiment of the present invention.

DETAILED DESCRIPTION OF THE
ILLUSTRATED EMBODIMENTS

The invention is described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure is thorough, and will fully convey the scope of the invention to those skilled in the art. In the drawings, the sizes and relative sizes of layers and regions may be exaggerated for clarity. Like reference numerals in the drawings denote like elements.

FIG. 1 illustrates a connection between a neighbor connect service system and a user terminal according to an exemplary embodiment of the present invention.

Referring to FIG. 1, the neighbor connect service system 100 sets up a neighbor relationship between internal blogs and external blogs based on a request from a user terminal 120 connected through a network 110. The internal blogs may refer to blogs of users subscribing to services of a company directly operated by the neighbor connect service system 100, and the external blogs may refer to blogs of users subscribing to services of other companies not operated by the neighbor connect service system 100. That is, the neighbor connect service system 100 sets up a neighbor relationship between a blog administered by a user of the user terminal 120 and a connected blog based on a request for setting up a neighbor relationship with the currently connected blog from the user terminal 120 connected through the network 110.

Further, the neighbor connect service system 100 provides information about the blog set up as the neighbor relationship to the user terminal 120 connected through the network 110 based on a neighbor connect service. That is, the neighbor connect service system 100 provides information about the blog set up as the neighbor relationship, such as a neighbor added by me, a neighbor adding me, a visited blog, a posting update of a neighbor, to the user terminal 120 connected through the network 110 based on the neighbor connect service.

Figure 2:
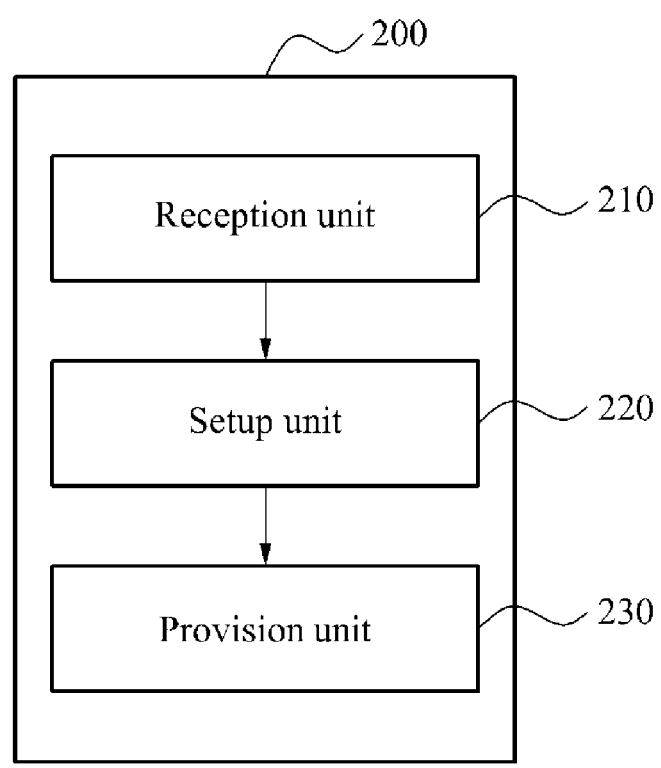
FIG. 2 illustrates a configuration of a neighbor connect service system according to an exemplary embodiment of the present invention.

FIG. 2 illustrates a configuration of a neighbor connect service system according to an exemplary embodiment of the present invention.

Referring to FIG. 2, the neighbor connect service system 200 includes a reception unit 210, a setup unit 220, and a provision unit 230.

The reception unit 210 receives a neighbor add request with respect to an external blog currently connected from a terminal of a user which operates an internal blog and is using a neighbor connect service.

The setup unit 220 sets up a neighbor relationship between internal blogs and external blogs. That is, the setup unit 220 sets up the currently connected external blog as a neighbor group with respect to the user based on the received neighbor add request.

The provision unit 230 provides information about a blog set up as the neighbor relationship based on the neighbor connect service.

In one exemplary embodiment, the provision unit 230 may display a neighbor added by a user of the blog, a neighbor adding the user as a neighbor, and a user visiting the blog, may be independently used in the external blog by a neighbor connect service program, and may provide a service for the user of the external blog to connect with another external blog.

In another exemplary embodiment, the provision unit 230 may continually display a neighbor connect service to increase a number of new users and provide a neighbor add functionality that is more simplified than an existing service in order to add a greater number of neighbors than a predetermined level. Further, the provision unit 230 may provide a neighbor connect service to enable use of a plurality of neighbor connect service programs using a single user identity (ID).

For example, the provision unit 230 may provide security, authorization, or access functions with respect to personal information about a user set up as a neighbor relationship based on the neighbor connect service.

In still another exemplary embodiment, the provision unit 230 may identify new postings of neighbors registered by the user and new postings of neighbors registered by other people through a new posting notification function, may administer neighbors or new postings through the neighbor connect service program, and may provide a neighbor statistical function.

Figure 3:
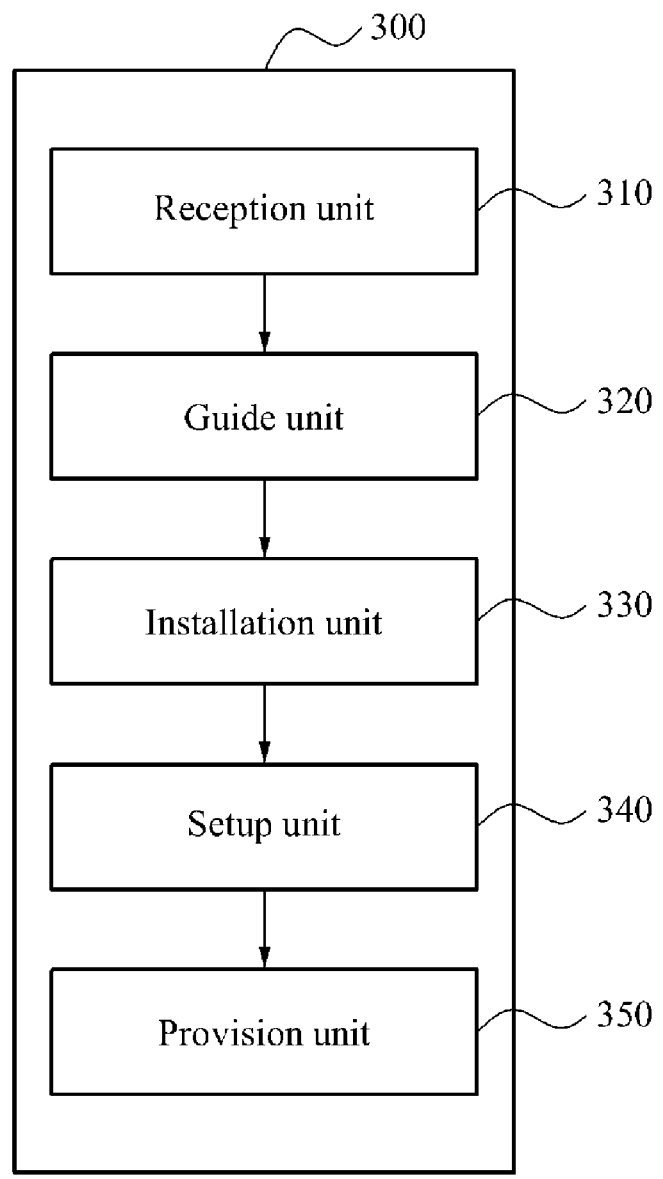
FIG. 3 illustrates a configuration of a neighbor connect service system according to another exemplary embodiment of the present invention.

FIG. 3 illustrates a configuration of a neighbor connect service system according to another exemplary embodiment of the present invention.

Referring to FIG. 3, the neighbor connect service system 300 includes a reception unit 310, a guide unit 320, an installation unit 330, a setup unit 340, and a provision unit 350.

The reception unit 310 receives a neighbor add request from a user terminal connected to a blog providing a neighbor connect service but not using the neighbor connect service.

The guide unit 320 guides the neighbor connect service to the user terminal based on the neighbor add request.

The installation unit 330 installs a neighbor connect program providing the neighbor connect service in the user terminal when the neighbor connect service is requested from the user.

The setup unit 340 sets up a neighbor relationship between a blog of the user and the blog connected with the user terminal based on the installed neighbor connect program.

The provision unit 350 provides information about the blog set up as the neighbor relationship based on the neighbor connect service.

Figure 4:
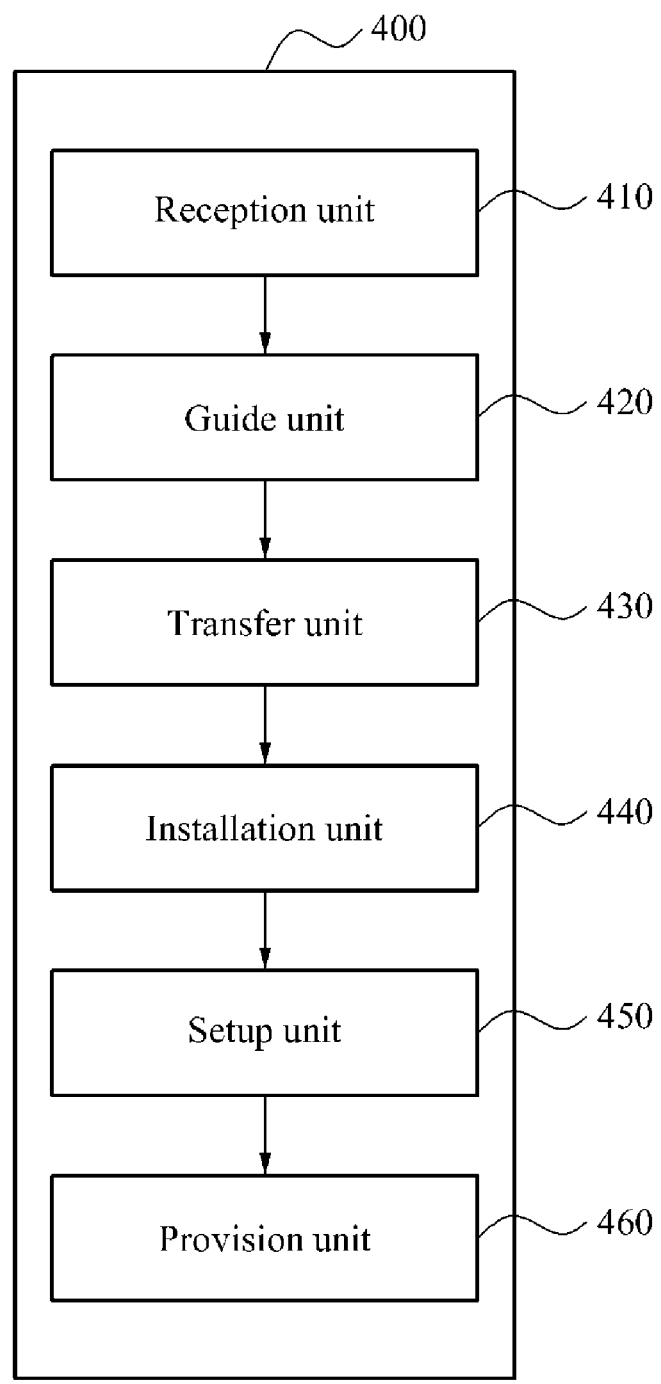
FIG. 4 illustrates a configuration of a neighbor connect service system according to still another exemplary embodiment of the present invention.

FIG. 4 illustrates a configuration of a neighbor connect service system according to still another exemplary embodiment of the present invention.

Referring to FIG. 4, the neighbor connect service system 400 includes a reception unit 410, a guide unit 420, a transfer unit 430, an installation unit 440, a setup unit 450, and a provision unit 460.

The reception unit 410 receives a neighbor add request from a user terminal which is connected to a blog providing a neighbor connect service but does not use the neighbor connect service.

The guide unit 420 guides the neighbor connect service to the user terminal based on the neighbor add request.

The transfer unit 430 makes a transfer to a site to install a neighbor connect service program on when embedding of the neighbor connect service program is selected from the user terminal. Further, the transfer unit 430 transfers the site for installation of the neighbor connect service program to an installation page of the neighbor connect service program selected by the user when a program of the user installing the program is selected on the site for the installation of the neighbor connect service program.

The installation 440 installs the neighbor connect service program in the user terminal. That is, the installation unit 440 installs the neighbor connect service program selected by the user in the user terminal.

The setup unit 450 sets up a neighbor relationship with the external blog based on the installed neighbor connect program.

The provision unit 460 provides information about the blog set up as the neighbor relationship based on the neighbor connect service.

Figure 5:
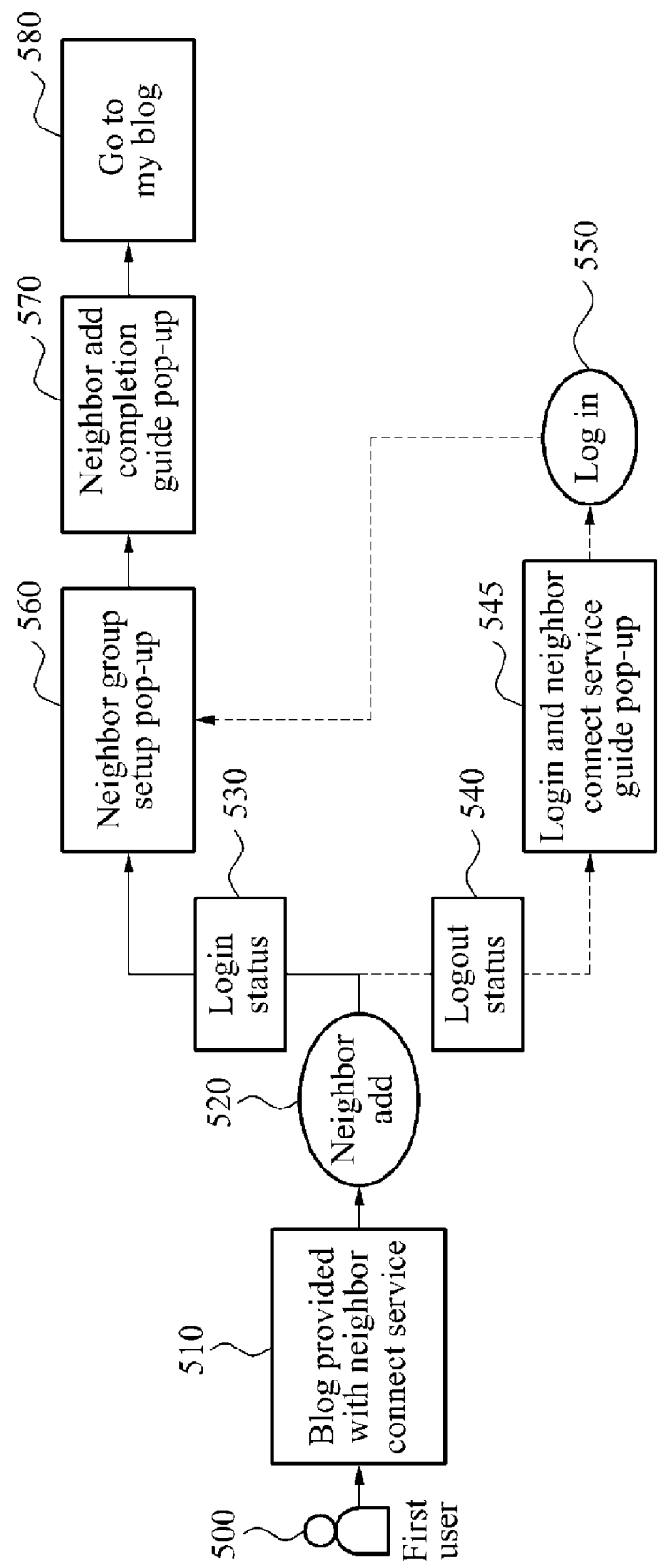
FIG. 5 illustrates a case where a first user who is using a neighbor connect service requests to add a neighbor with respect to a blog provided with the neighbor connect service according to an exemplary embodiment of the present invention.

FIG. 5 illustrates a case where a first user who is using a neighbor connect service requests adding a neighbor with respect to a blog provided with the neighbor connect service according to an exemplary embodiment of the present invention.

Referring to FIGS. 1 and 5, the neighbor connect service system 100 receives a neighbor add 520 request with respect to a blog 510 provided with the neighbor connect service from the user terminal 120 of the first user 500 using the neighbor connect service connected through the network 110.

The neighbor connect service system 100 provides a neighbor group setup pop-up 560 menu to the user terminal 120 of the first user 500 when the first user 500 is in a login status 530.

The neighbor connect service system 100 provides a login and neighbor connect service guide pop-up 545 menu when the first user 500 is in a logout 540 status. Then, the neighbor connect service system 100 provides a neighbor group setup pop-up 560 menu to the user terminal 120 of the first user 500 when the first user 500 logs in 550.

When neighbor group setup is completed, the neighbor connect service system 100 provides a neighbor add completion guide pop-up 570 menu to the user terminal 120 of the first user 500 through the network 110. When the first user 500 selects a go to my blog menu, the neighbor connect service system 100 provides a go to my blog 580 service to the user terminal 120 of the first user 500 through the network 110.

Figure 6:
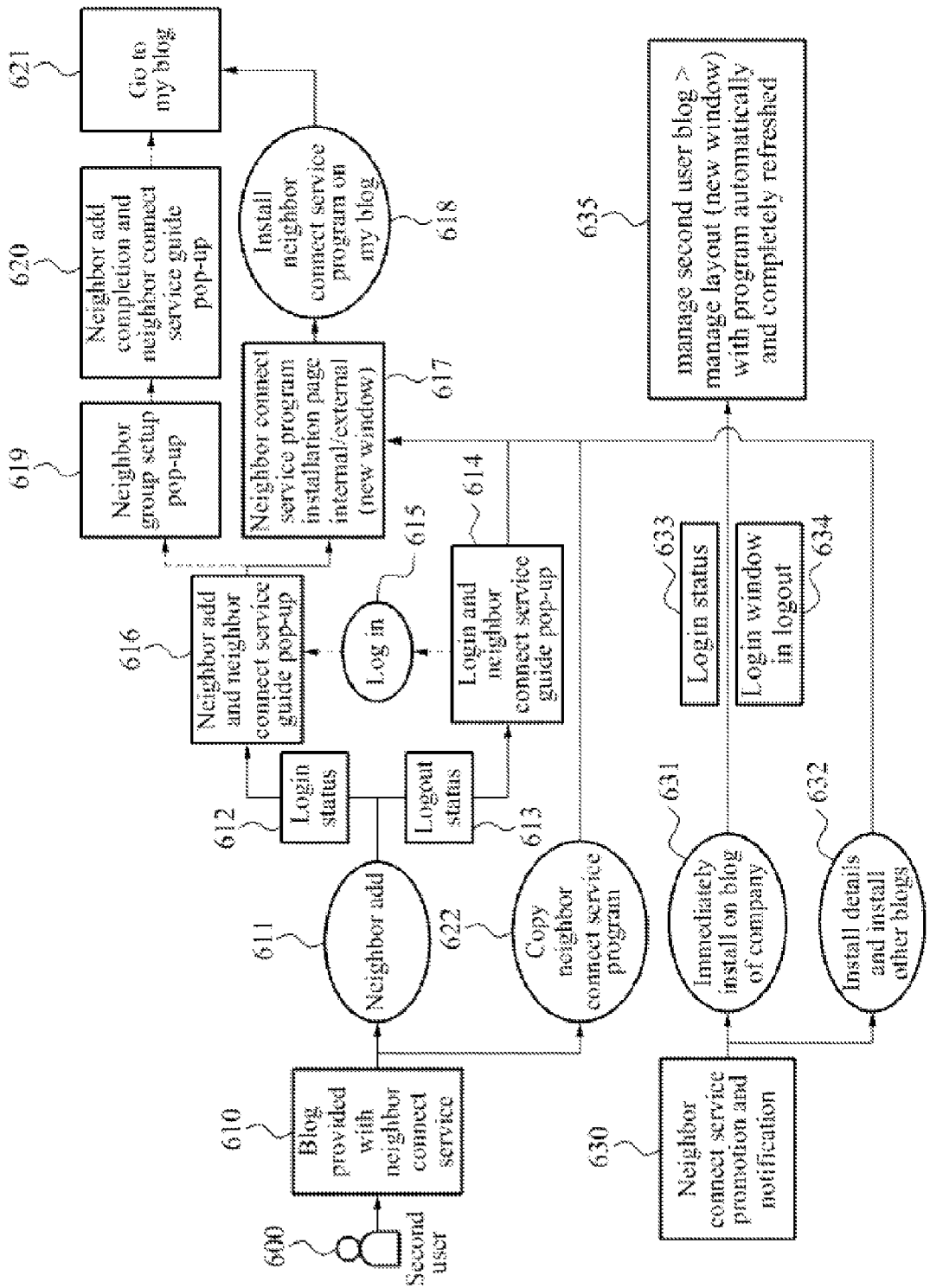
FIG. 6 illustrates a case where a second user who is not using the neighbor connect service requests to add a neighbor with respect to a blog provided with the neighbor connect service according to an exemplary embodiment of the present invention.

FIG. 6 illustrates a case where a second user who is not using the neighbor connect service requests adding a neighbor with respect to a blog provided with the neighbor connect service according to an exemplary embodiment of the present invention.

Referring to FIGS. 1 and 6, the neighbor connect service system 100 receives a neighbor add 611 request with respect to a blog 610 provided with the neighbor connect service and connected to the user terminal 120 of the second user 600 not using the neighbor connect service through the network 110.

When the second user 600 is in a login status 612, the neighbor connect service system 100 provides a neighbor add and neighbor connect service guide pop-up 616 to the user terminal 120 of the second user 600 through the network 110 based on the neighbor add request.

When the second user 600 is in a logout status 613, the neighbor connect service system 100 provides a login and neighbor connect service guide pop-up 614 to the user terminal 120 of the second user 600 through the network 110 based on the neighbor add request.

The neighbor connect service system 100 provides a neighbor connect service program installation page internally/externally (new window) 617 to the user terminal 120 of the second user 600 through the network 110, provides a function for installing the neighbor connect service program on my blog 618 to the user terminal 120 of the second user 600, and provides a go-to-my-blog menu 621 based on a request of the second user 600.

When a neighbor relationship is set up between blogs based on a neighbor group setup pop-up 619, the neighbor connect service system 100 provides a neighbor add completion and neighbor connect service guide pop-up 620 to the user terminal 120 of the second user 600 through the network 110 and provides the go-to-my-blog menu 621 based on a request of the second user 600.

The neighbor connect service system 100 provides copying of a neighbor connect service program 622 to the user terminal 120 of the second user 600 connected to the blog 610 provided with the neighbor connect service through the network 110.

When the user terminal 120 of the second user 600 not using the neighbor connect service is connected through the network 110, the neighbor connect service system 100 provides a neighbor connect service promotion and notification 630.

The neighbor connect service system 100 provides a function 631 for immediate installation on a blog of the company based on the neighbor connect service promotion, provides a login window in logout status 634, and thus provides a second user blog management/layout management menu (new window) with the program automatically and completely refreshed 635 when the second user is in a login status 633.

The neighbor connect service system 100 provides a function for installations in detail and installations on other blogs 632 to implement the neighbor connect service program installation page internally/externally (new window) 617 and a function for installing the neighbor connect service program on my blog 618, and then provides the go-to-my-blog menu 621 to the user terminal 120 of the second user 600 through the network 110.

Figure 7:
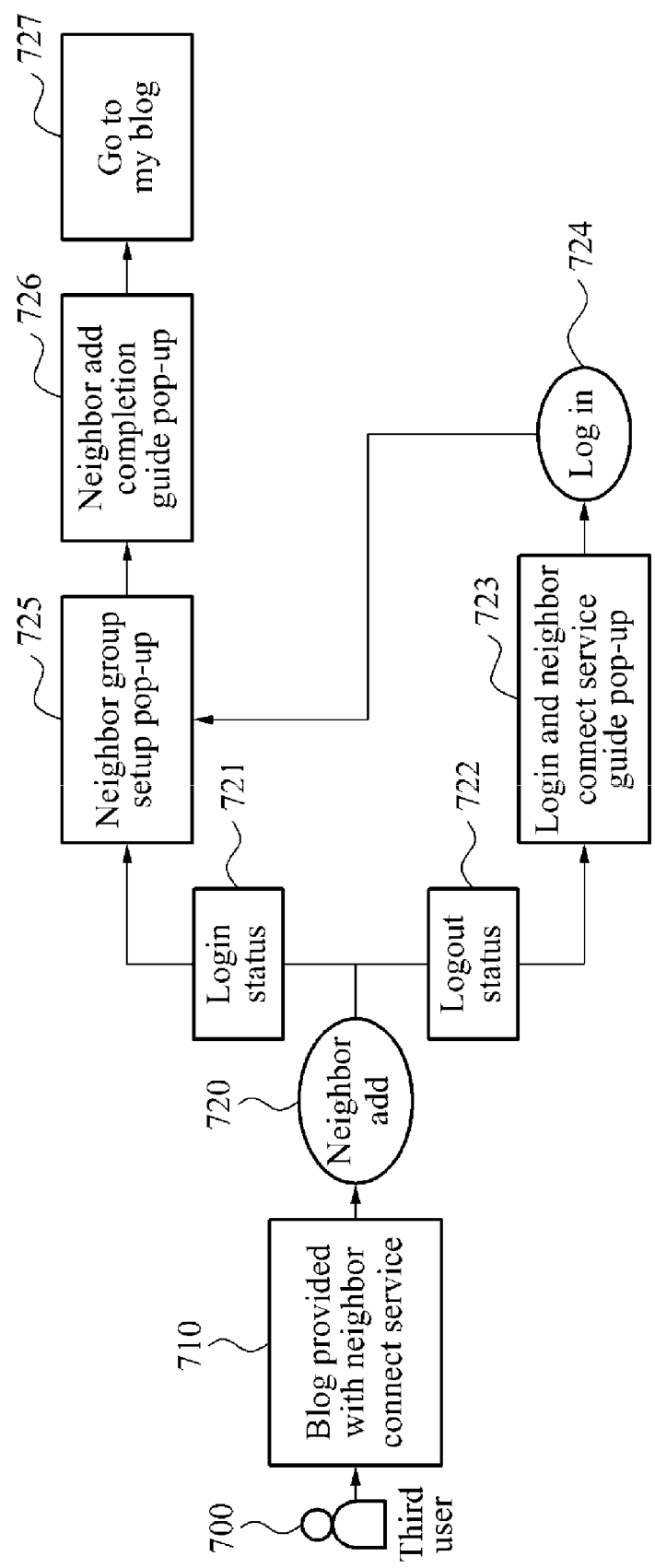
FIG. 7 illustrates a case where a third user of an external blog who is using the neighbor connect service requests to add a neighbor with respect to a blog provided with the neighbor connect service according to an exemplary embodiment the present invention.

FIG. 7 illustrates a case where a third user of an external blog who is using the neighbor connect service requests adding neighbor with respect to a blog provided with the neighbor connect service according to an exemplary embodiment of the present invention.

Referring to FIGS. 1 and 7, the neighbor connect service system 100 receives a neighbor add 720 request with respect to a blog 710 provided with the neighbor connect service from the user terminal 120 of the third user 700, a user of the external blog who does not subscribe to the service of the company, through the network 110.

In a logout status 722, the neighbor connect service system 100 provides a login and neighbor connect service guide pop-up 723 to the user terminal 120 of the third user 700 connected through the network 110.

When the third user 700 of the user terminal 120 connected through the network 110 logs in 724, the neighbor connect service system 100 provides a neighbor group setup pop-up 725 to the user terminal 120 of the third user 700 connected through the network 110 in a login status 721 and provides a go to my blog 727 service based on a request from the user terminal 120 of the third user 700.

Figure 8:
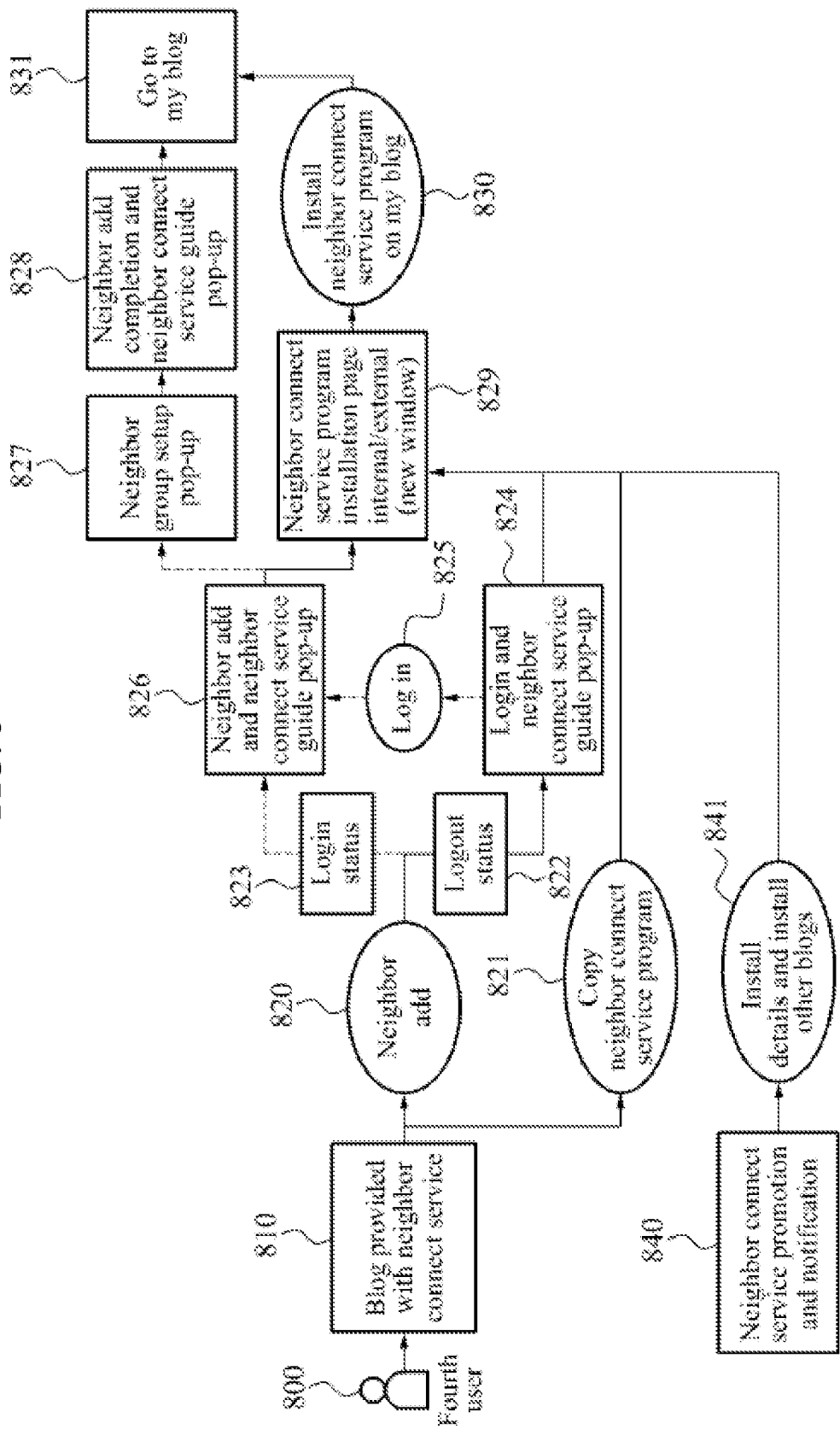
FIG. 8 illustrates a case where a fourth user of an external blog who is not using the neighbor connect service requests to add a neighbor with respect to a blog provided with the neighbor connect service according to the present invention.

FIG. 8 illustrates a case where a fourth user of an external blog who is not using the neighbor connect service requests adding a neighbor with respect to a blog provided with the neighbor connect service according to an exemplary embodiment of the present invention.

Referring to FIGS. 1 and 8, the neighbor connect service system 100 receives a neighbor add 820 request at a blog 810 provided with the neighbor connect service and connected to the user terminal 120 of the fourth user 800, who is a user of the external blog not using the neighbor connect service through the network 110.

When the fourth user 800 is in a logout status 822, the neighbor connect service system 100 provides a login and neighbor connect service guide pop-up 824 to the user terminal 120 of the fourth user 800 through the network 110 based on the neighbor add request.

When the fourth user 800 is in a login status 823 or logs in 825, the neighbor connect service system 100 provides a neighbor group setup pop-up 827 and a neighbor add and neighbor connect service guide pop-up 828 to the user terminal 120 of the fourth user 800 through the network 110 based on the neighbor add request.

The neighbor connect service system 100 provides a neighbor connect service program installation page internal/external (new window) 829 to the user terminal 120 of the fourth user 800 through the network 110, provides a function for installing the neighbor connect service program on my blog 830 to the user terminal 120 of the fourth user 800, and provides a go to my blog 831 based on a request of the fourth user 800.

When a neighbor relationship is set up between blogs based on a neighbor group setup pop-up 827, the neighbor connect service system 100 provides a neighbor add completion and neighbor connect service guide pop-up 828 to the user terminal 120 of the fourth user 800 through the network 110 and provides the go to my blog 831 based on a request of the fourth user 800.

The neighbor connect service system 100 provides a function for copying the neighbor connect service program 821 to the user terminal 120 of the fourth user 800 connected to the blog 810 provided with the neighbor connect service through the network 110, provides the neighbor connect service program installation page internal/external new window 829, provides the install neighbor connect program on my blog 830, and provides the go to my blog menu 831.

When the user terminal 120 of the fourth user 800 not using the neighbor connect service is connected through the network 110, the neighbor connect service system 100 provides a neighbor connect service promotion and notification 840.

The neighbor connect service system 100 provides a function for installing in detail and installing on other blogs 841 based on a neighbor connect service promotion, provides an internal/external new window for the neighbor connect service program installation page 829, provides a function for installing the neighbor connect service program on my blog 830, and provides the-go-to-my-blog function 831.

Figure 9:
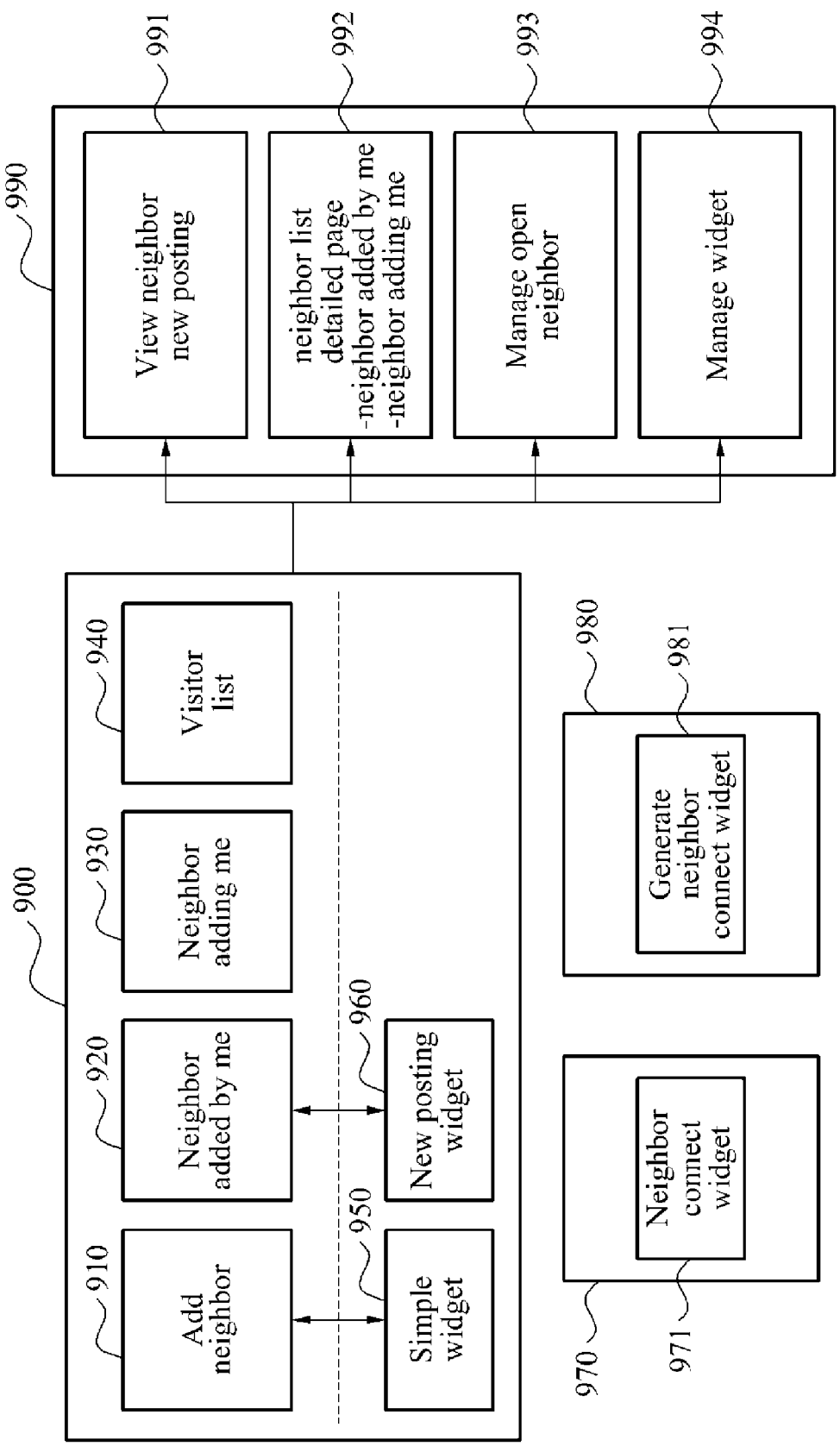
FIG. 9 illustrates a whole configuration of a neighbor connect service structure according to an exemplary embodiment the present invention.

FIG. 9 illustrates a whole configuration of a neighbor connect service structure according to an exemplary embodiment of the present invention.

Referring to FIG. 9, a neighbor connect service 900 may provide functions for add neighbor 910, a neighbor added by me 920, a neighbor adding me 930, and a visitor list 940, and may provide a simple widget 950, a new posting widget 960, and a base widget as neighbor connect widgets.

For example, in the neighbor connect service 900, a neighbor connect widget 971 may be inserted onto a blog 970 as a code, and a widget for generating neighbor connect 981 may be generated per subscriber ID on a connect widget generation page 980.

For example, the neighbor connect service 900 may provide a function for viewing more-pages 990, including for viewing neighbors' new postings 991, a detailed neighbor list page—neighbors added by me—neighbors adding me 992, for managing open neighbors 993, and for managing widgets 994.

Figure 10:
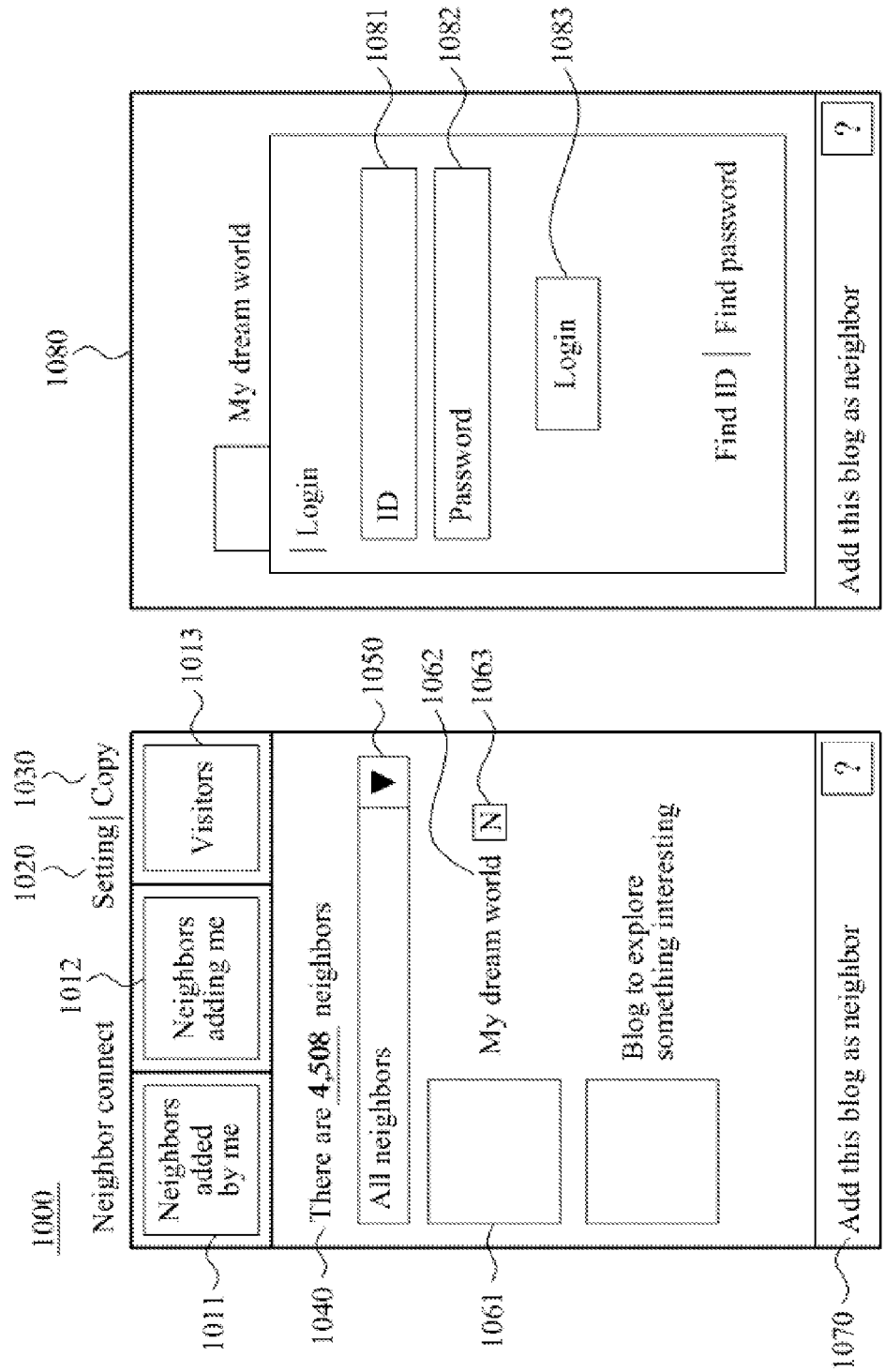
FIG. 10 illustrates a screen for requesting login when adding a blog as a neighbor is requested through a neighbor connect service in a logout status according to an exemplary embodiment the present invention.

FIG. 10 illustrates a screen for requesting a login when adding of a blog as a neighbor is requested through a neighbor connect service in a logout status according to an exemplary embodiment of the present invention.

Referring to FIG. 10, the neighbor connect service identifies information about neighbors added by me 1011, neighbors adding me 1012, and visitors 1013 as a neighbor connect 1000 and includes menus for managing 1020 and copying 1030. The neighbor connect 1000 includes functions for displaying the number of neighbors 1040, all neighbors 1050, a neighbor blog image 1061, a neighbor blog name 1062, a new posting 1063, and for adding this blog as neighbor 1070. The number of neighbors 1040 may be the number of neighbors added by me or adding me, the all neighbors 1050 is a menu to select how to arrange all neighbors, the neighbor blog image 1061 is a representative image of a neighbor blog, the neighbor blog name 1062 is a title of the neighbor blog, and the new posting 1063 displays whether a new posting is posted on the neighbor blog. The add-this-blog-as-neighbor 1070 may provide a function of adding a corresponding blog as a neighbor for the neighbor connect service.

When the add-this-blog-as-neighbor 1070 is selected and the user is not logged in, the neighbor connect service system 100 provides a login screen 1080 to the user terminal 120 through the network 110. The login screen 1080 includes an ID entry box 1081, a password entry box 1082, and a login menu 1083. When an ID is input in the ID entry box 1081, a password is input in the password entry box 1082, and the login menu 1083 is selected from the user terminal 120 connected through the network 110, the neighbor connect service system 100 allows the user to log in with the ID and the password. When the ID or password is incorrect, the neighbor connect service system 100 may provide a login re-confirmation request window to the user terminal 120 connected through the network 110.

Figure 11:
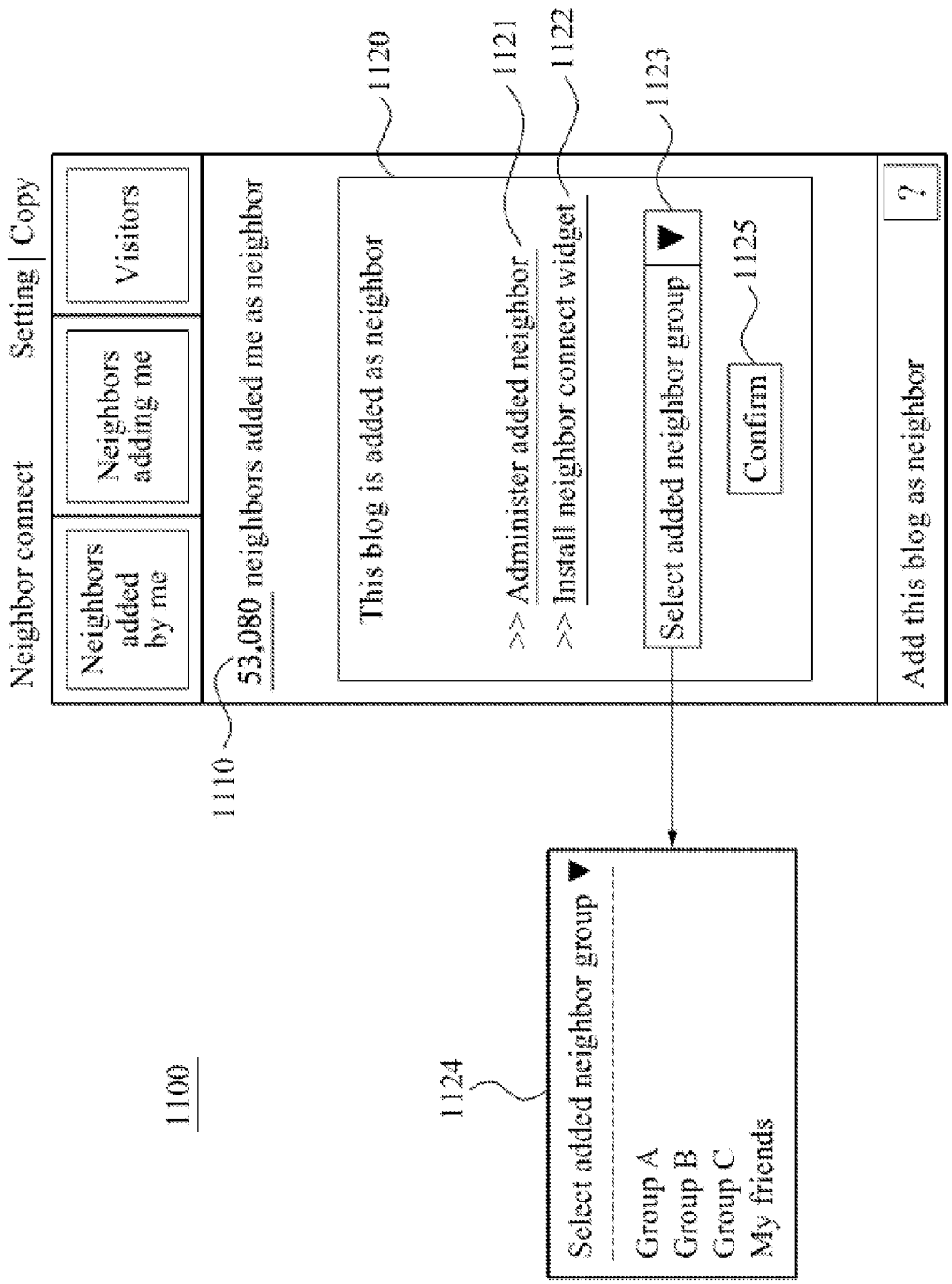
FIG. 11 illustrates a screen for selecting an added neighbor group when a blog is added as a neighbor through a neighbor connect service in a login status according to an exemplary embodiment the present invention.

FIG. 11 illustrates a screen for selecting an added neighbor group when a blog is added as a neighbor through a neighbor connect service in a login status according to an exemplary embodiment of the present invention.

Referring to FIG. 11, when a user who requests adding a blog as a neighbor is in a logout status, the neighbor connect service system 100 displays a number of neighbors added as neighbors 1110 and provides a menu window 1120 for adding a neighbor blog. The menu window 1120 for adding the neighbor blog includes menus for managing added neighbors 1121, for installing neighbor connect widgets 1122, for selecting added neighbor groups 1123, an added neighbor group selection window 1124, and a confirm menu 1125.

When the neighbor connect service is completed, the neighbor connect service system 100 may provide a confirmation window displaying that the blog is completely added as a neighbor to the user terminal 120 connected through the network 110.

Figure 12:
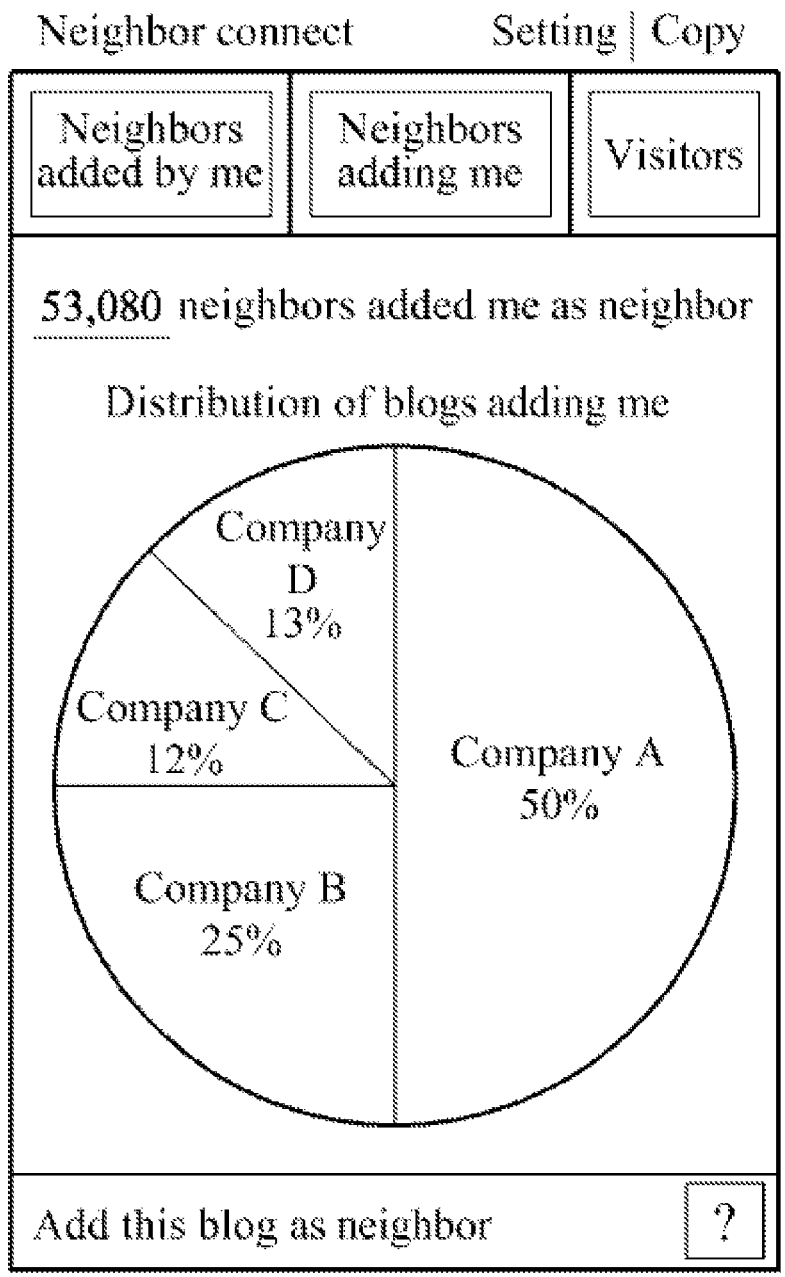
FIG. 12 illustrates a distribution of blogs adding a user as a neighbor in a neighbor connect service according to an exemplary embodiment the present invention.

FIG. 12 illustrates a distribution of blogs adding a user as a neighbor in a neighbor connect service according to an exemplary embodiment of the present invention.

Referring to FIG. 12, a neighbor connect 1200 provides distributions of blogs adding a certain blog as a neighbor, classified by blog providers, wherein the distribution may be displayed in various forms, such as a circle graph, a bar graph, a bent line graph, and the like. When the blog is added as a neighbor, the neighbor connect service system 100 may provide various types of information, such as a number of neighbors adding the blog as a neighbor, distribution of blogs involving addition, and a ranking of the number of neighbors adding the blog as a neighbor among widget-installed blogs, to the user terminal 120 through the network 110. The distributions of the blogs involving addition may be obtained by extracting a list of neighbors adding the blog based on the address of the representative blog among the users who installed the neighbor connect, and may be provided in a graph, which may be in various formats based on the requests of the users, while unidentified addresses or independent domains may be sorted into a category for others.

The ranking of the number of neighbors may be divided into a ranking using an internal blog as a representative blog and a ranking using an external blog as a representative blog. The same ranking may be displayed in two ways, and only blogs having the widget installed may be ranked based on the number of neighbors involving addition. Objects to be ranked may participate in ranking competition among blogs selected as representative blogs. As another example, if a blogger already having 100,000 neighbors that added me operates blogs of both company A and company B and has the widget installed on both blogs, the blogger may participate in the ranking competition. For example, if the blogger selects the blog of the company A as a representative blog, the blogger ranks the top only in rankings of the company A and is excluded from the ranking competition of the company B, of which the blog is not a representative blog, and a ranking list may not appear in the widget. For bloggers who are objects to be ranked but do not want to reveal rankings, a ranking on/off functionality may be provided for selection and update time may be set up.

Figure 13:
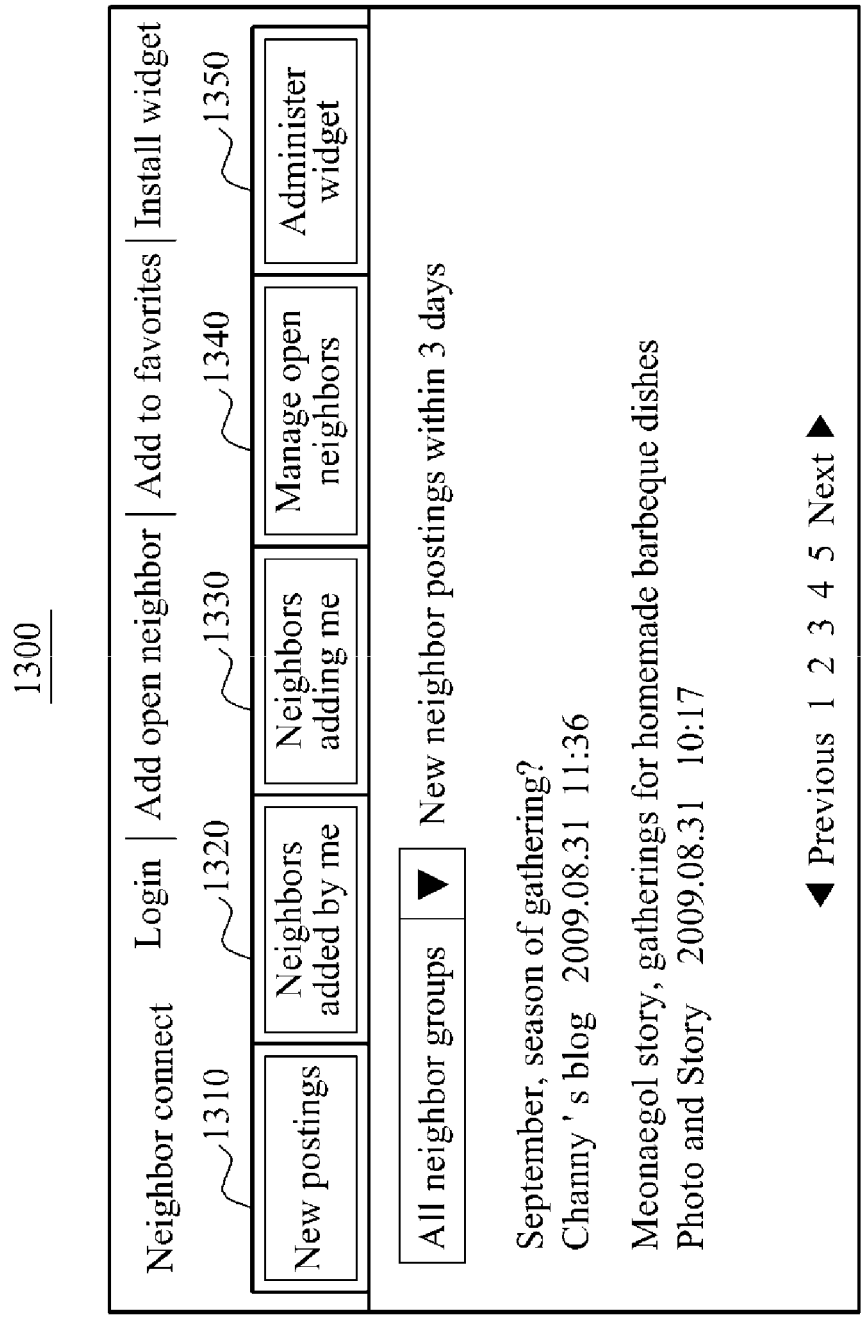
FIG. 13 illustrates a new posting on a view neighbor connect widget more page in a neighbor connect service according to an exemplary embodiment the present invention.

FIG. 13 illustrates viewing new posts on a page for viewing more neighbor connect widgets in a neighbor connect service according to an exemplary embodiment of the present invention.

Referring to FIG. 13, a page for viewing more neighbor connects 1300 may be configured in independent pages, may include menus for viewing new postings 1310, neighbors added by me 1320, neighbors adding me 1330, for managing open neighbors 1340, and for managing widgets 1350, and may display neighbors who recently updated with new postings among all neighbors in updated order. The view-more-neighbor-connect page 1300 may have a URL in a substructure of a blog, may provide statistics of the neighbors added by me 1320 and the neighbors adding me 1330 and a menu for viewing new postings, which are viewed by anyone without a need of logging in, and may provide the menus for managing open neighbors 1340, for managing widget 1350, and a list of neighbors adding me, which are viewed when logged in. When logging in from view-more pages of other people, only the same menus as shown in a logout status may be displayed, a warning message may be provided with respect to menus that are supposed to be shown to the host only, and the bottom paging may be the default paging used on the blog.

Figure 14:
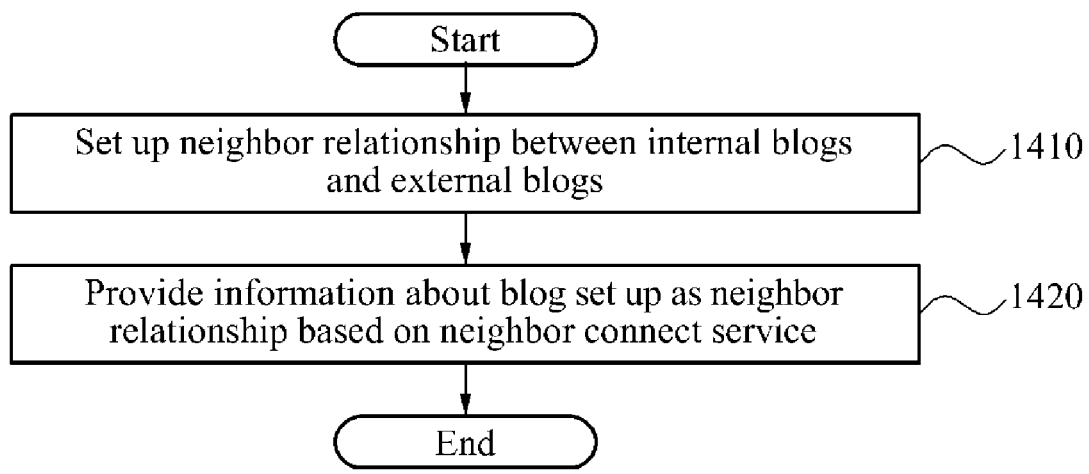
FIG. 14 illustrates an operational flowchart of a neighbor connect service method according to an exemplary embodiment of the present invention.

FIG. 14 illustrates an operational flowchart of a neighbor connect service method according to an exemplary embodiment of the present invention.

Referring to FIGS. 1 and 14, in operation 1410, the neighbor connect service system 100 sets up a neighbor relationship between internal blogs and external blogs. The internal blogs refer to blogs of users subscribing to services of the company, and the external blogs refer to blogs of users subscribing to services of the other companies that do not operate the neighbor connect service system 100. For example, the internal blogs may be blogs of users subscribing to company A administering the neighbor connect service system 100, and the external blogs may be blogs of users subscribing to company B not administering the neighbor connect service system 100. That is, in operation 1410, when the user terminal 120 connected through the network 110 requests addition of a blog as a neighbor, the neighbor connect service system 100 sets up a neighbor relationship between an internal or external blog requested as the neighbor and a blog operated by the user of the user terminal 120.

For example, in operation 1410, the neighbor connect service system 100 may further receive a neighbor add request with respect to an external blog currently online from the user terminal operating the internal blog and using the neighbor connect service and may set up the currently online external blog as a neighbor group with respect to the user based on the received neighbor add request.

Further to this example, in operation 1410, the neighbor connect service system 100 may further receive a neighbor add request with respect to an internal blog providing the neighbor connect service from the user terminal 120 using an external blog providing the neighbor connect service and may set up the external blog to have a neighbor relationship as a neighbor group of the internal blog.

Figure 15:
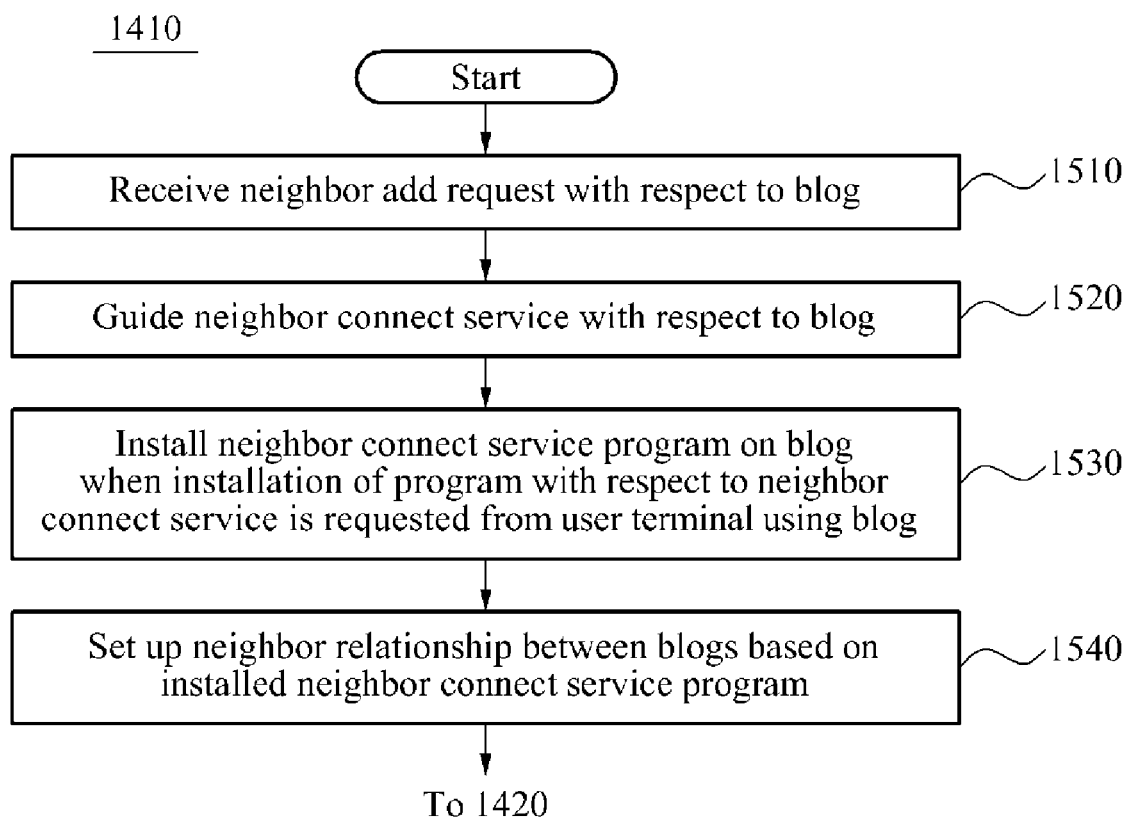
FIG. 15 illustrates an operational flowchart of setting up a neighbor relationship between blogs in a neighbor connect service according to an exemplary embodiment the present invention.

FIG. 15 illustrates setting up a neighbor relationship between blogs in a neighbor connect service according to an exemplary embodiment of the present invention.

Referring to FIGS. 1 and 15, in operation 1510, the neighbor connect service system 100 receives a neighbor add request from the user terminal 120 connected to a blog providing the neighbor connect service but not using the neighbor connect service.

In operation 1520, the neighbor connect service system 100 guides the neighbor connect service to the user terminal 120 based on the neighbor add request.

In operation 1530, the neighbor connect service system 100 installs a neighbor connect program providing the neighbor connect service in the user terminal 120 when the neighbor connect service is requested from the user.

In operation 1540, the neighbor connect service system 100 sets up a neighbor relationship with the external blog based on the installed neighbor connect program.

In another exemplary embodiment, in operation 1410, the neighbor connect service system 100 may further include receiving a neighbor add request with respect to an internal blog not using the neighbor connect service from the user terminal 120 using an external blog providing the neighbor connect service, guiding the neighbor connect service with respect to the internal blog, and installing the neighbor connect service program on the internal blog when a request for installation of the neighbor connect service program is made from the user terminal 120 using the internal blog, and may set up a neighbor relationship between the external blog and the internal blog based on the neighbor connect service program.

In still another exemplary embodiment, in operation 1410, the neighbor connect service system 100 may further include making a transfer to a site on which to install the neighbor connect service program when copying of the neighbor connect service program is selected from the user terminal 120, transferring the site for installation of the neighbor connect service program to an installation page of the neighbor connect service program selected by the user when a program of the user installing the program is selected on the site for the installation of the neighbor connect service program, and installing the neighbor connect service program in the user terminal 120.

In operation 1420, the neighbor connect service system 100 provides information about the blog set up as the neighbor relationship based on the neighbor connect service. For example, the neighbor connect service may display neighbors added by the user of the blog, neighboring adding the user as a neighbor, and users visiting the blog. Alternatively, the neighbor connect service may be used independently in the external blog by the neighbor connect service program and may be used for the user of the external blog to connect to another external blog. Further, the neighbor connect service may be continually displayed in order to increase the number of new users, may have a more simplified neighbor addition functionality than an existing service in order to add a greater number of neighbors than a predetermined level, and may enable use of plurality of neighbor connect service programs with a single user ID. Also, the neighbor connect service may provide security, authorization, or access functions with respect to personal information about the user set up as the neighbor relationship. In addition, the neighbor connect service may identify new postings of neighbors registered by the user and new postings of neighbors registered by other people through a new posting notification function, may administer neighbors or new postings through the neighbor connect service program, and may provide a neighbor statistical function.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for providing a neighbor connect service between an internal blog of a first user subscribing to the neighbor connect service and an external blog of a second user not subscribing to the neighbor connect service, the system comprising:
    a storage device comprising a plurality of units, executable by a processor, the plurality of units including,
    a reception unit configured to receive a neighbor add request from a user terminal administering one of the internal blog and the external blog, to set up a neighbor relationship with other of the internal blog and the external blog;
    a setup unit configured to set up the neighbor relationship between the internal blog of the first user and the external blog of the second user upon receipt of the neighbor add request from the user terminal;
    a provision unit configured to provide information associated with the set up of the neighbor relationship between the internal blog and the external blog, the information indicating at least a number of neighbor relationships set up from neighbor add requests from the user terminal;
    wherein the reception unit is configured to receive the neighbor add request from a user terminal administering the internal blog using the neighbor connect service;
    a guide unit configured to guide the user terminal administering the internal blog in the set up of the neighbor relationship based on the neighbor add request; and
    an installation unit configured to install a neighbor connect program in the user terminal administering the internal blog for enabling the user terminal administering the internal blog to request set up of the neighbor relationship in response to the neighbor add request from the user terminal administering the internal blog;
    wherein the setup unit is configured to set up the neighbor relationship with the external blog based on the installed neighbor connect program.

2. The system of claim 1, wherein the setup unit is configured to set up the external blog as a neighbor group based on the neighbor add request.

3. The system of claim 1, wherein the reception unit is configured to receive the neighbor add request from a user terminal administering the external blog, the user terminal administering the external blog having the neighbor connect program installed thereon; and wherein the setup unit is configured to set up the neighbor relationship between the external blog and the internal blog using the neighbor connect program.

4. The system of claim 1, wherein reception unit is configured to receive the neighbor add request to an internal blog not using the neighbor connect service, the request being from a user terminal administering an external blog using the neighbor connect service; the guide unit is configured to guide the user terminal administering the external blog in the set up of the neighbor relationship; the installation unit is configured to install a neighbor connect service program on the internal blog when installation of the neighbor connect service program is requested from a user terminal administering the internal blog; and wherein the setup unit is configured to set up a neighbor relationship between the external blog and the internal blog with the installed neighbor connect service program.

5. The system of claim 1, wherein the provision unit is configured to provide a service for the user of the external blog to connect with another external blog.

6. The system of claim 1, wherein the provision unit is configured to provide a security function, an authorization function, or access function with respect to the neighbor relationship.

7. The system of claim 1, wherein the provision unit is configured to identify new postings in the internal blog and the external blog having the neighbor relationship through a new posting notification function, and is configured to administer neighbors or new postings, and is configured to provide a neighbor statistical function.

8. The system of claim 1, wherein the plurality of units further comprises:
    a transfer unit configured to display a site on which to install the neighbor connect service program, in response to receipt of a selection of a menu for copying of the neighbor connect service program from the user terminal administering the one of the internal blog and the external blog;
    wherein the installation unit is configured to install the neighbor connect service program in the user terminal administering the one of the internal blog and the external blog.

9. A system for providing a neighbor connect service between an internal blog of a first user subscribing to the neighbor connect service and an external blog of a second user not subscribing to the neighbor connect service, the system comprising:
    a storage device comprising one or more units, executable by a processor, the one or more units including,
    a reception unit configured to receive a neighbor add request from a user terminal administering one of the internal blog and the external blog, to set up a neighbor relationship with other of the internal blog and the external blog;
    a setup unit configured to set up the neighbor relationship between the internal blog of the first user and the external blog of the second user upon receipt of the neighbor add request from the user terminal; and a provision unit configured to provide information associated with the set up of the neighbor relationship between the internal blog and the external blog, the information indicating at least a number of neighbor relationships set up from neighbor add requests from the user terminal;

wherein the provision unit is configured to continually display the set up of the neighbor relationship to increase a number of new users, to provide a neighbor add function to add a number of neighbors according to a threshold level, and is configured to provide the neighbor connect service to connect a plurality of neighbors using a single user identity (ID).

10. A method that uses a processor to provide a neighbor connect service between an internal blog of a first user subscribing to the neighbor connect service and an external blog of a second user not subscribing to the neighbor connect service, the method comprising:

receiving a neighbor add request from a user terminal administering one of the internal blog and the external blog, to set up a neighbor relationship with other of the internal blog and the external blog;

setting up the neighbor relationship between the internal blog of the first user and the external blog of the second user upon receipt of the neighbor add request from the user terminal;

providing information associated with the set up of the neighbor relationship between the internal blog and the external blog, the information indicating at least a number of neighbor relationships set up from neighbor add requests from the user terminal;

wherein the neighbor add request is received from a user terminal administering the internal blog using the neighbor connect service;

guiding the user terminal administering the internal blog in the set up of the neighbor relationship based on the neighbor add request;

installing a neighbor connect program in the user terminal administering the internal blog for enabling the user terminal administering the internal blog to request set up of the neighbor relationship in response to the neighbor add request from the user terminal administering the internal blog; and setting up the neighbor relationship with the external blog based on the installed neighbor connect program.

11. The method of claim 10, wherein the neighbor add request is received from a user terminal administering the external blog, the user terminal administering the external blog having the neighbor connect program installed thereon, and the neighbor relationship is set up between the external blog and the internal blog using the neighbor connect program.

12. The method of claim 10, wherein the neighbor add request is received with respect to an internal blog not using the neighbor connect service from a user terminal administering an external blog using the neighbor connect service;

the user terminal administering the external blog is guided in the set up of the neighbor relationship;

the neighbor connect service program is installed on the internal blog when installation of the neighbor connect service program is requested from a user terminal administering the internal blog; and the neighbor relationship set up between the external blog and the internal blog using the installed neighbor connect service program.

13. The method of claim 10, wherein the neighbor connect service provides a service for the user of the external blog to connect with another external blog.

14. The method of claim 10, further comprising:

providing a security function, an authorization function, or access function with respect to the neighbor relationship.

15. The method of claim 10, further comprising:

identifying new postings in the internal blog and the external blog having the neighbor relationship through a new posting notification function, managing neighbors or new postings through a neighbor connect service program, and providing a neighbor statistical function.

16. The method of claim 10, further comprising:

displaying a site on which to install the neighbor connect service program in response to receipt of a selection of a menu for copying of the neighbor connect service program from the user terminal administering the one of the internal blog and the external blog; and installing the neighbor connect service program in the user terminal administering the one of the internal blog and the external blog.

17. A method that uses a processor to provide a neighbor connect service between an internal blog of a first user subscribing to the neighbor connect service and an external blog of a second user not subscribing to the neighbor connect service, the method comprising:

receiving a neighbor add request from a user terminal administering one of the internal blog and the external blog, to set up a neighbor relationship with other of the internal blog and the external blog;

setting up the neighbor relationship between the internal blog of the first user and the external blog of the second user upon receipt of the neighbor add request from the user terminal;

providing information associated with the set up of the neighbor relationship between the internal blog and the external blog, the information indicating at least a number of neighbor relationships set up from neighbor add requests from the user terminal; and continually displaying the set up of the neighbor relationship to increase a number of new users, providing a neighbor add function to add a number of neighbors according to a threshold level, and connecting a plurality of neighbors using a single user identity (ID).

18. A non-transitory computer-readable recording medium storing an executable program for performing a neighbor connect service between an internal blog of a first user subscribing to the neighbor connect service and an external blog of a second user not subscribing to the neighbor connect service, the program, when executed by a processor, causing the processor to perform the steps comprising:

receiving a neighbor add request from a user terminal administering one of the internal blog and the external blog, to set up a neighbor relationship with other of the internal blog and the external blog;

setting up the neighbor relationship between the internal blog of the first user and the external blog of the second user upon receipt of the neighbor add request from the user terminal;

providing information associated with the set up of the neighbor relationship between the internal blog and the external blog, the information indicating at least a number of neighbor relationships set up from neighbor add requests from the user terminal;

wherein the neighbor add request is received from a user terminal administering the internal blog using the neighbor connect service;

guiding the user terminal administering the internal blog in the set up of the neighbor relationship based on the neighbor add request;

installing a neighbor connect program in the user terminal administering the internal blog for enabling the user terminal administering the internal blog to request set up of the neighbor relationship in response to the neighbor add request from the user terminal administering the internal blog; and setting up the neighbor relationship with the external blog based on the installed neighbor connect program.

* * * * *